United States Patent [19]

Eberhard et al.

[11] Patent Number: 4,650,169
[45] Date of Patent: Mar. 17, 1987

[54] HYDRAULICALLY DAMPED RESILIENT MOUNTING

[75] Inventors: Günter Eberhard, Gehrden; Jürgen Heitzig, Hanover, both of Fed. Rep. of Germany

[73] Assignee: Continental Gummi-Werke Aktiengesellschaft, Hanover, Fed. Rep. of Germany

[21] Appl. No.: 796,639

[22] Filed: Nov. 8, 1985

[30] Foreign Application Priority Data

Nov. 14, 1984 [DE] Fed. Rep. of Germany ....... 3441592

[51] Int. Cl.⁴ .............................................. F16F 1/54
[52] U.S. Cl. .................................. 267/140.1; 267/8 R; 267/64.14
[58] Field of Search ................. 267/140.1, 8 R, 64.11, 267/64.14, 64.25; 180/312; 248/562, 634

[56] References Cited

U.S. PATENT DOCUMENTS 3,116,918  1/1964  Francis ............................. 267/64.14
4,352,487 10/1982  Shtarkman ....................... 267/140.1
4,401,298  8/1983  Eaton et al. ...................... 267/140.1

FOREIGN PATENT DOCUMENTS 3210731 10/1983  Fed. Rep. of Germany ... 267/140.1
2068079  8/1981  United Kingdom ............. 267/140.1

Primary Examiner—George E. A. Halvosa
Assistant Examiner—Matthew C. Graham
Attorney, Agent, or Firm—Becker & Becker, Inc.

[57] ABSTRACT

A hydraulically damped resilient mounting. Compared to undamped mountings, motor mounts having hydraulic damping transmit more noise because the damping device that is desirable for driving comfort favors the transmission of noise. The inventive damping device can be selectively activated or deactivated as needed by shifting the damping fluid, which is moved as a single incompressible body. For this purpose, the damping fluid is accommodated between two flexible diaphragms that are subjected to pressure differentials which are produced randomly or are controlled by a computer.

4 Claims, 1 Drawing Figure

HYDRAULICALLY DAMPED RESILIENT MOUNTING

BACKGROUND OF THE INVENTION

1. Field of the Invention

The present invention relates to a hydraulically damped resilient mounting, especially for the engine of a motor vehicle, and includes a cup-shaped housing, the upper peripheral edge of which, when viewed in the loading direction, is closed-off by an elastic shock-absorbing element. The damping fluid is contained in the housing on both sides of a partition that spans the interior of the housing and has a continuously open, narrow relief passage.

2. Description of the Prior Art

The oscillations of such motor mounts, as such oscillations are generated during operation of the vehicle, are customarily damped by deformation of the elastic shock-absorbing elements along with equidirectional throttled displacement of damping fluid through the relief bores in the partition; the oscillations are thereby rapidly damped. Although this damping considerably increases the driving comfort, the noise transmitted by such a damping device is greater than with an undamped mounting.

An object of the present invention therefore is to provide a novel mounting design whereby the damping device can be selectively activated or deactivated with the objective of being able to provide the normally undamped mounting, which oscillates and therefore protects against noise, when needed, a damping which then has greater acoustical transmission.

BRIEF DESCRIPTION OF THE DRAWING

This object, and other objects and advantages of the present invention, will appear more clearly from the following specification in conjunction with the schematic drawing, in which.

SUMMARY OF THE INVENTION

Figures 1A, 1B:
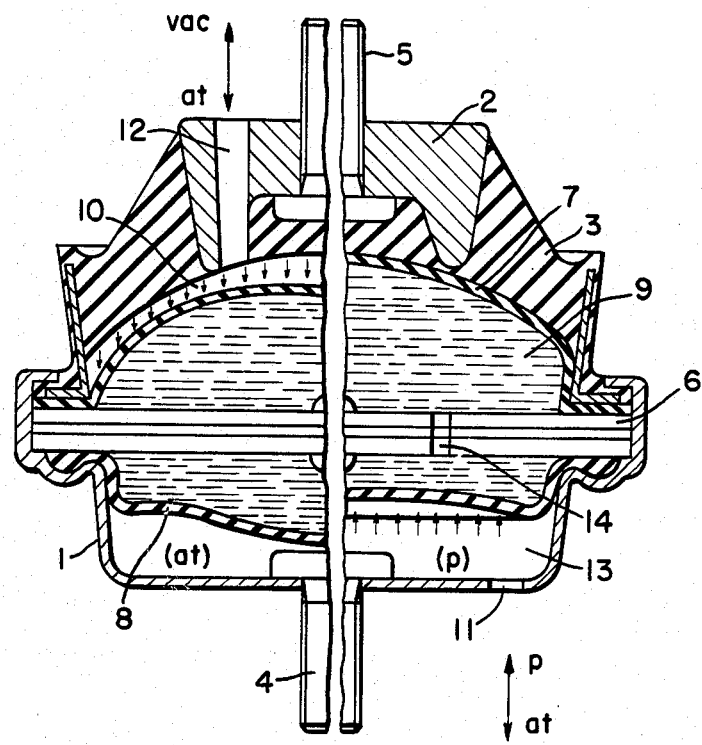
FIG. 1A is a cross-sectional view through one embodiment of the inventive motor mount, which deactivated damping.
FIG. 1B is a cross-sectional view through one inventive embodiment of a motor mount, with activated damping.

The mounting of the present invention is characterized primarily by a first flexible diaphragm that is sealingly secured to the cup-shaped housing on one side of the partition in the vicinity of the shock-absorbing element, and by a second flexible diaphragm that is sealingly secured to the housing on the other side of the partition remote from the first diaphragm, with the damping fluid being accommodated between the two diaphragms; in response to the effect of pressure differentials acting on the outer surfaces of the diaphragms, the damping fluid shifts in the axial direction relative to the shock-absorbing element.

Pursuant to an important specific embodiment of the present invention, the damping fluid can be shifted counter to the direction of the static load until the upper or first diaphragm rests against the shock-absorbing element. The shifting of the damping fluid, which is moved as a single incompressible body, can be brought about by either subjecting that outer surface of the upper membrane that faces the shock-absorbing element to a partial vacuum or to atmospheric pressure or a pressure greater than atmospheric pressure, or the outer surface of the lower membrane with atmospheric pressure or a pressure greater than atmospheric pressure.

The present invention leads to resilient mountings having individually installed hydraulic damping units that as a result of their compact combined accommodation and arrangement, can be activated or deactivated as needed and desired for the specific shock-absorbing elements. By appropriately controlled pressure application on the diaphragms, it is possible, for example for normal driving operation, to keep the damping fluid at a distance from the elastic shock-absorbing element, thus assuring that the noise of the mounting is blocked. On the other hand, by reversing the pressure application, damping action can be activated at any time. Shifting between the damped and undamped operating states can be undertaken at random, for example with the aid of solenoid valves that can be controlled from the dashboard, or automatically by means of a computer as a function of predetermined parameters.

DESCRIPTION OF PREFERRED EMBODIMENTS

Referring now to the drawing in detail, the essential parts of the illustrated mounting include a cup-shaped housing 1, and an upper support element 2 that is supported relative to the housing 1 via a conically concave elastic suspension or shock-absorbing element 3. At the same time, the element 3 closes off the top of the housing 1, which is preferably a molded metal part. With the aid of a bolt 4 attached to the bottom of the housing, the mounting can be secured to a non-illustrated part of the body of the vehicle, whereas the support element 2 is provided with a bolt 5 for receiving a similarly not-illustrated engine bracket. A rigid partition 6 is clamped in a peripheral flange of the housing 1, and divides the outwardly closed-off interior of the housing into two chambers that are interconnected in a throttled manner, in a known manner, via a continuously open relief bore 14 that is disposed in the partition.

Together with the partition 6, an upper diaphragm 7 and a lower diaphragm 8 on the two sides of the partition are placed into the housing flange and are sealingly secured relative to one another. The space between the diaphragms is completely filled with a damping fluid 9. Due to the fact that it is incompressible, the damping fluid 9 determines the shape of the flexible diaphragms and follows the changes in shape of the diaphragms, which changes are inversely mandated on the outside, in conformity with the flow capacity of the narrow relief bore 14 in the partition. Such changes in the shape of the diaphragms 7 and 8, which lead to axial shifting of the damping fluid 9, can be brought about by applying pressure differentials to those outer surfaces of the diaphragms remote from the damping fluid.

Normally, i.e. in a stress-free state illustrated in FIG. 1A, the upper diaphragm 7 is spaced from the shock-absorbing element 3, with the free space 10 formed between the diaphragm 7 and the element 3 communicating via a passage or bore 12 in the support element 2 with the atmosphere, as indicated at the head "at" of the double arrow. At the same time, the free space 13 below the diaphragm 8 communicates via a bore or hole 11 in the wall of the housing with the atmosphere, as indicated at the head "at" of the double arrow, so that this diaphragm 8 is in a slightly downwardly curved position of rest that is also practically stress-free, being only under the weight of the damping fluid. Consequently, the damping system is inactive, and the mounting oscillates purely elastically in an undamped manner while preserving a favorable acoustic suppression effect.

As shown in FIG. 1B, to activate a damping effect, the damping device as a whole is raised until it rests against the diaphragm 7 of the shock-absorbing element 3 either by applying a partial vacuum (the arrow head "vac") to the upper diaphragm 7, and/or by applying pressure (the arrow head "p") to the lower diaphragm 8, so that resulting deformations of the shock-absorbing element 3 entail and have as a consequence similar throttled shifting of the damping fluid above and below the partition 6.

The present invention is, of course, in no way restricted to the specific disclosure of the specification and drawing, but also encompasses any modifications within the scope of the appended claims.

What we claim is:

1. A hydraulically damped resilient mounting, including a cup-shaped housing, the upper peripheral edge of which, when viewed in the loading direction, is closed-off by an elastic shock-absorbing element; a hydraulic damping fluid is contained in said housing on both sides of a partition that spans the interior of said housing and has a continuously open, narrow relief passage; said mounting further comprises:
   a first flexible diaphragm sealingly secured to said housing on one side of said partition in the vicinity of said shock-absorbing element; and
   a second flexible diaphragm sealingly secured to said housing on the other side of said partition remote from said first diaphragm, with said damping fluid being accommodated in a fluid chamber between said first and second diaphragms; in response to the effect of pressure differentials acting on sides of said first and second diaphragms remote from said damping fluid, said damping fluid shifts in the axial direction of said mounting relative to said shock-absorbing element in which said shifting of said damping fluid can occur in a direction counter to static load until said first diaphragm rests against said shock-absorbing element and furthermore one of said flexible diaphragms being shiftable via intentional pressure effectiveness thereon so that selectively on the one hand a free space is formed between said first flexible diaphragm and said elastic shock-absorbing element with a result that load change leads to a deformation of said elastic shock-absorbing element without any hydraulic damping and on the other hand said first flexible diaphragm engages against said elastic shock-absorbing element with an effect that every deformation of said elastic shock-absorbing element as a consequence of load changes positively actuates a flow of hydraulic damping fluid via a relief bore so that elastic deformation occurs together with hydraulic damping.

2. A mounting according to claim 1, in which said first diaphragm has a surface that faces said shock-absorbing element; and which includes means for selectively subjecting said last-mentioned surface of said first diaphragm to a partial vacuum, atmospheric pressure, and a pressure greater than atmospheric pressure.

3. A mounting according to claim 2, in which said second diaphragm has a surface that is remote from said damping fluid and is constantly subjected to atmospheric pressure.

4. A mounting according to claim 1, in which said second diaphragm has a surface that is remote from said damping fluid and is selectively subjected to atmospheric pressure and a pressure greater than atmospheric pressure.

* * * * *